(12) United States Patent
Batrin

(10) Patent No.: US 6,836,944 B2
(45) Date of Patent: Jan. 4, 2005

(54) COMBINATION TOOL WITH AUTOMATED TOOL CHANGE FOR ROBOT ASSISTED ASSEMBLY

(75) Inventor: Marius Batrin, Mississauga (CA)

(73) Assignee: ABB, Inc., Ontario (CA)

(*) Notice: Subject to any disclaimer, the term of this patent is extended or adjusted under 35 U.S.C. 154(b) by 0 days.

(21) Appl. No.: 10/614,133

(22) Filed: Jul. 8, 2003

(65) Prior Publication Data
US 2004/0006864 A1 Jan. 15, 2004

Related U.S. Application Data

(63) Continuation-in-part of application No. 09/983,557, filed on Oct. 25, 2001, now Pat. No. 6,606,774.

(51) Int. Cl.[7] .......................... G01M 19/00; B23P 11/00; B23Q 3/00; B23Q 21/00
(52) U.S. Cl. .................... 29/407.1; 29/407.08; 29/428; 29/466; 29/707
(58) Field of Search ...................... 29/407.08, 407.1, 29/428, 466, 407.09, 445, 707, 712; 33/568, 520, 644

(56) References Cited

U.S. PATENT DOCUMENTS 6,327,768 B1 * 12/2001 Cappa et al. ............... 29/407.1
6,408,531 B1 * 6/2002 Schimmels .................. 33/644

* cited by examiner

Primary Examiner—John C. Hong
(74) Attorney, Agent, or Firm—Ogilvy Renault; Paul J. Field

(57) ABSTRACT

A method of assembling a part to a workpiece with a combination tool supported on a robot, where a mounting surface of the part is assembled on a target surface of the workpiece including the following steps. (a) Indexing to the assembly position. (b) Picking a part with the part gripper on the part delivery arm from a part supply station. (c) Indexing part delivery and workpiece preparation arms to the preparation position. (d) Simultaneously: engaging the part mounting surface with the part surface preparation module; and engaging the workpiece target surface preparation module with the target surface. (e) Indexing to the assembly position. (f) Using the previously set tool operating axis and calculated tool offsets, engaging the prepared part mounting surface with the prepared workpiece target surface. (g) Releasing the part gripper and withdrawing the tool from the part/workpiece assembly.

19 Claims, 17 Drawing Sheets

COMBINATION TOOL WITH AUTOMATED TOOL CHANGE FOR ROBOT ASSISTED ASSEMBLY

RELATED APPLICATION

This application is a continuation-in-part of U.S. patent application Ser. No. 09/983,557, filed Oct. 25, 2001, now U.S. Pat. No. 6,606,774, for a Combination Tool for Robot Assisted Assembly.

TECHNICAL FIELD

The invention relates to a method and tool for assembling a part to a workpiece with the tool supported on The invention relates to a method and tool for assembling a part to a workpiece with the tool supported on a robot, where a prepared mounting surface of the part is assembled on a prepared target surface of the workpiece, in a thermal plastic welding process, for example.

BACKGROUND OF THE ART

The invention generally relates to the use of specialized tools or manufacturing processes in the robotic assembly of manufactured components such as automobile parts. In the example used herein, thermal plastic welding of plastic gas tanks for automotive applications is described.

The invention provides an assembly tool that is mounted to a conventional robot and a method of robot assisted assembly as a component of a sequential manufacturing process. The process typically involves a robot that is stationary on a pedestal that selects parts from a tray or other stationary supply and transfers the part to be assembled on a workpiece as the workpiece is conveyed passed the robot, usually in a stepped manner.

A significant advantage of the invention is that cycle time is reduced by simultaneous manufacturing operations carried out by at least two arms on a combination tool resulting in time and cost savings. The combined tool includes means to grip the part, laser scan the workpiece, calculate any offsets required for proper positioning within predetermined tolerances, heating plastic part surfaces and workpiece part surfaces simultaneously, and pressing heated surfaces together to form a thermal plastic weld joint and impervious fluid seal.

It will be understood that plastic welding is used only as an example to describe one application of the invention and that the tool is readily adaptable and equally advantageously used for robot assisted assembly in any number of alternative technologies. For example, the tool can be used for heating plastic surfaces, adhesive application, sealant application, grinding or abrading, or cutting surfaces by replacing the surface preparation modules mounted on the multiple arms of the combination tool. Packaging multiples tools together in a flexible combination tool that can be easily modified for various applications, provides a much higher degree of flexibility and quick tool change over compared with conventional assembly operations.

In the prior art, welding plastic parts in the automotive industry for example, involves applying heat to the workpiece and/or heat to the part, then exerting sufficient pressure to bond the plastic surfaces together providing a seal and physical joint. Conventional operations utilize two separate tools and two separate robots. One robot with one tool is used for preparation or heating of the workpiece. A second robot and tool is used for preparation or heating of the part, and assembling the part to the workpiece. The capital costs, maintenance and programming involved in operating two separate robots for two separate operations is expensive and undesirable. However manufacturers are under pressure to deliver relatively low volumes of assemblies in decreasing amounts of time due to changes in manufacturing practices, such as "just in time" delivery and extremely low inventory levels. Rapid adaptation and customization of orders is becoming more and more desirable, so the high degree of flexibility obtained through separating robot operations has been considered necessary.

An alternative assembly method is a conventional automated assembly line with separated dedicated fixtures, jigs and tools that prepare the workpiece and part separately and assemble them in a staggered or step wise conveyed fashion. Such dedicated tools are generally less flexible, less expensive and require less technical sophistication than robots. However, these benefits come at the expense of increased cycle time and increased costs in long term operation due to the extensive downtime and cost of changeovers and tool refitting when a new product style is manufactured.

Increasingly, auto parts manufacturers in particular are required to deliver parts to an assembler "just in time" which results in much shorter runs of a particular part design. Rapid tool changeover and rapid adaptation for various styles of assemblies or different assemblies altogether is becoming essential in a highly competitive auto parts manufacturing environment. As a result, the separate dedicated tools that are suitable for long high volume runs at low cost are becoming less and less economically viable whereas processes that provide high degrees and flexibility and rapid changeover for different styles are becoming the norm.

As an example, with separate dedicated tools an automobile part supplier would set up a separate manufacturing line for gas tanks, bumpers, fenders, dashboards and other commoncomponents. The economic viability of such specialized lines depends on high volume orders and long production runs, preferably with very little change in the design of individual products or the general layout of the manufacturing facility. Increasingly however manufacturers require delivery of parts from suppliers in smaller volumes and with less lead time than in the past. In addition, pressures to lower costs and speed up tool changeovers are forcing manufacturers to consider much more flexible manufacturing procedures involving robots, component handling and conveyor systems that can be programmed or adapted for multiple functions.

It is an object of the present invention therefore to improve cycle time and process efficiency for manufacturing and assembly operations by utilising combination tools for single robot assisted assembly to replace dedicated one robot/one function tool methods.

It is a further object of the invention to reduce capital expending and improve long term viability of assembly line methods by reducing the number of expensive robots required by utilising tools that have multiple functions and providing simultaneous tool operations thereby reducing cycle time and improving efficiency.

Further objects of the invention will be apparent from review of the disclosure, drawings and description of the invention below.

DISCLOSURE OF THE INVENTION

The invention provides a method of assembling a part to a workpiece with a combination tool supported on a robot, wherein a mounting surface of the part is assembled on a target surface of the workpiece. The combination tool has a base matching a tool support of the robot that supports a workpiece arm and a part delivery arm. The workpiece arm has a workpiece target surface preparation module mounted interchangeably using a common tool interface module that provides mechanical connection with electrical power, communications as well as pneumatic and hydraulic connections as required . The part delivery arm includes an interchangeable part gripper also mounted with a common tool interface and capable of releasably holding the part with part mounting surface exposed. A part mounting surface preparation module also mounted with a common tool interface is supported by the base between: an engaged position in contact with the part mounting surface while the part is held in the part gripper; and a disengaged position retracted from the part mounting surface. An indexing module is supported on the base, and alternates between: a preparation position; and the assembly position, such that: the indexing module in the preparation position supports the workpiece arm aligned on the operating axis while simultaneously supporting the part delivery arm aligned with the part mounting surface preparation module and such that: the indexing module in the assembly position supports the workpiece arm withdrawn from the workpiece while simultaneously supporting the part delivery arm aligned on the operating axis.

Due to the common tool interface for all tools, such as hot plates and part grippers, tool changes require minimal time and investment. Cycle times are reduced and cost savings result. The system can quickly adapt for changeover of parts by simply depositing a tool in a tool rack, and engaging another tool on the common tool interface. For example: hot plates and part grippers for different sized parts may be designed to have a common tool interface. When the programming calls for a part change, the robot may exchange tools rapidly due to the common tool interface for all tools. Locating pins on all tools ensure accurate storage positioning in the tool rack and enables quick tool changes since the exact position and orientation of the tool is determined.

The method includes the following steps. (a) Indexing to the assembly position. (b) Picking a part with the part gripper on the part delivery arm from a part supply station. (c) Indexing arms to the preparation position. (d) Operating the workpiece target surface scanning module and communicating workpiece target surface position data to the robot. (e) Moving the robot to set the tool operating axis and calculate tool offsets relative to the position and orientation of the scanned target surface. (f) Simultaneously: engaging the part mounting surface with the part surface preparation module; and engaging the workpiece target surface preparation module with the target surface. (g) Indexing to the assembly position. (h) Using the previously set tool operating axis and calculated tool offsets, engaging the prepared part mounting surface with the prepared workpiece target surface. (i) Releasing the part gripper and withdrawing the tool from the part/workpiece assembly.

By packaging multiple tools in a single combination tool, and enabling simultaneous operation, the cycle time of the assembly process is reduced. Conventional robot assembly systems often use separate tools on separate robots for each function. Using combination tools not only permits reduction in capital costs associated with each robot, but also reduces cycle time by using the same positioning offset data to be used by the robot to position each tool of the combination array. Conventional redundancies are eliminated, in the physical need for multiple robots, redundant robot motions are avoided and scanned position data redundancy is avoided by using the same positioning data for operating each tool.

Further advantages of the invention include reduction in assembly area size through use of compact combination tools and single robots, reduced tool changeover time, and increased accuracy and reliability through elimination of robot movements and multiple positioning operations.

DESCRIPTION OF THE DRAWING

In order that the invention may be readily understood, two embodiments of the invention are illustrated by way of example in the accompanying drawings.

FIG. 8 is an exploded perspective view of a combination tool, showing the workpiece arm towards the right with part delivery arm directed upwardly in alignment with the mounting surface preparation heater module where both arms are mounted to a 180° rotary actuator in a mutually parallel disposition.

FIG. 9 shows a side view of the second embodiment in the "home" position, with the part delivery arm facing upward toward the mounting surface preparation heater withdrawn upwardly, and the target surface preparation heater facing downwardly.

FIG. 10 shows a like side view after 180° rotation to face the part delivery arm downwardly to pick a part with the part gripper.

FIG. 11 shows a side view where the arms are again rotated 180° to face the part delivery arm upward to engage the mounting surface preparation heater driven downwardly to heat the part mounting surface and the workpiece arm is directed downwardly to heat the target surface of the tank.

FIG. 12 shows a final progressive side view where the arms are again rotated 180° the workpiece arm is directed upwardly to disengage the hot target surface of the tank and the part delivery arm downward to engage target surface of the tank with the heated surface of the part held in the part gripper.

FIG. 13 is a perspective view of the part gripper showing three locating pins, and the interchangeable commoninterface that mates with the tool.

FIG. 14 shows a side view of the part gripper.

FIG. 15 is a perspective view of the hotplate, or target surface preparation heater, showing three locating pins, and the interchangeable common interface that mates with the tool.

FIG. 16 shows a side view of the hotplate.

FIG. 17 is a perspective view of a load cell showing three locating pins, and the interchangeable common interface that mates with the tool.

Further details of the invention and its advantages will be apparent from the detailed description included below.

DETAILED DESCRIPTION OF PREFERRED EMBODIMENTS

Figure 2:
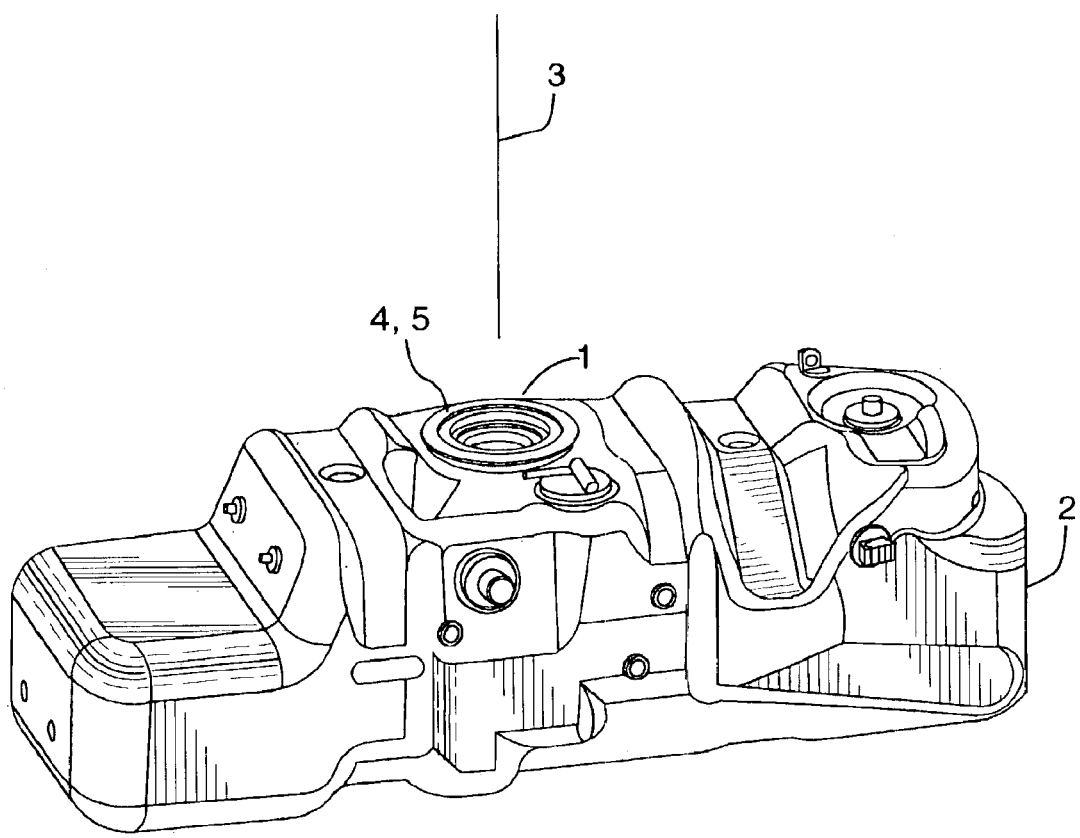
FIG. 2 is a perspective view of one example of a workpiece namely a blow moulded plastic gas tank with various vent ports, fluid inlets and outlets as well as mounting attachments, all of which can qualify as "parts" to be assembled to the gas tank workpiece utilising the invention.

FIG. 2 shows an example workpiece 2 in the form of a blow moulded plastic gas tank which includes a fitting known as a "sender ring". For simplicity the sender ring will be simply identified as the part 1 which is thermally plastic welded to the gas tank workpiece 2 during the operation described below. As seen in FIG. 2 however, the gas tank workpiece 2 includes a number of vents and fittings which may also be installed using the method described here.

The sender ring part 1 and the target surface 5 on the workpiece have an alignment axis that ideally should coincide exactly with the operating axis 3 of the combination tool. The alignment/operating axis 3 is used to orient and align the part 1 on the workpiece 2 and is used as a reference vector. As it is appreciated by those skilled in the art, a blow moulded plastic gas tank may have significant variation in its outer dimensions due to various causes inherent in the manufacturing process such as shrinkage of the thermal plastic material after forming, temperature variations during assembly and conventional manufacturing tolerances which are relatively large for blow moulded components. As a result, before mounting any part 1 on the target surface 5 of the workpiece 2 it is advantageous to specifically scan each target surface to determine the precise position of the target surface and to produce offset positioning data that is conveyed to the robot to adjust its orientation and position to suit the scanned data derived from the workpiece 2.

Figure 1:
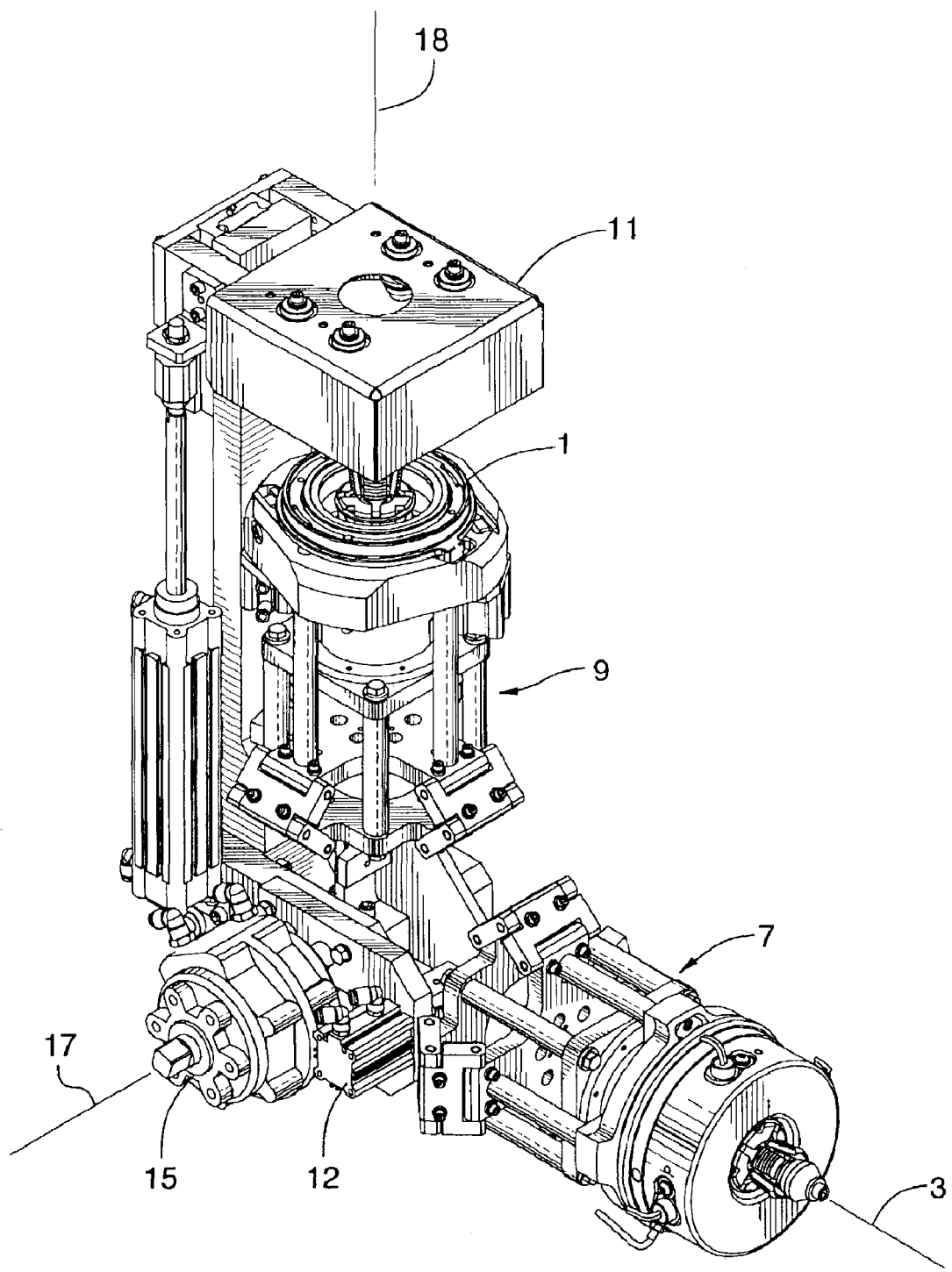
FIG. 1 is a perspective view of a first embodiment of a combination tool, showing the workpiece arm towards the right with part delivery arm directed upwardly in alignment with the mounting surface preparation heater module where both arms are mounted to a transverse shaft with rotary actuator in a mutually orthogonal disposition.

FIG. 1 shows a combination tool for assembling the part 1 to the workpiece 2 with a robot (not illustrated). The robot follows a program series of predetermined motions for locating the combination tool along the operating axis 3, moving the tool axially along the operating axis 3 as well as picking the part 1 from a supply and transferring the part 1 to an assembly position aligned on the operating axis 3. When the part 1 is in the assembly position, an annular mounting surface 4 of the part matches and engages with a target surface 5 of the workpiece 2. In the example given, the annular plastic surfaces of the part 1 and workpiece 2 are planar annular surfaces that are heated to a temperature sufficient to enable welding of the plastic surfaces together once engaged and once sufficient pressure is applied thereby bonding the surfaces together.

Figure 3:
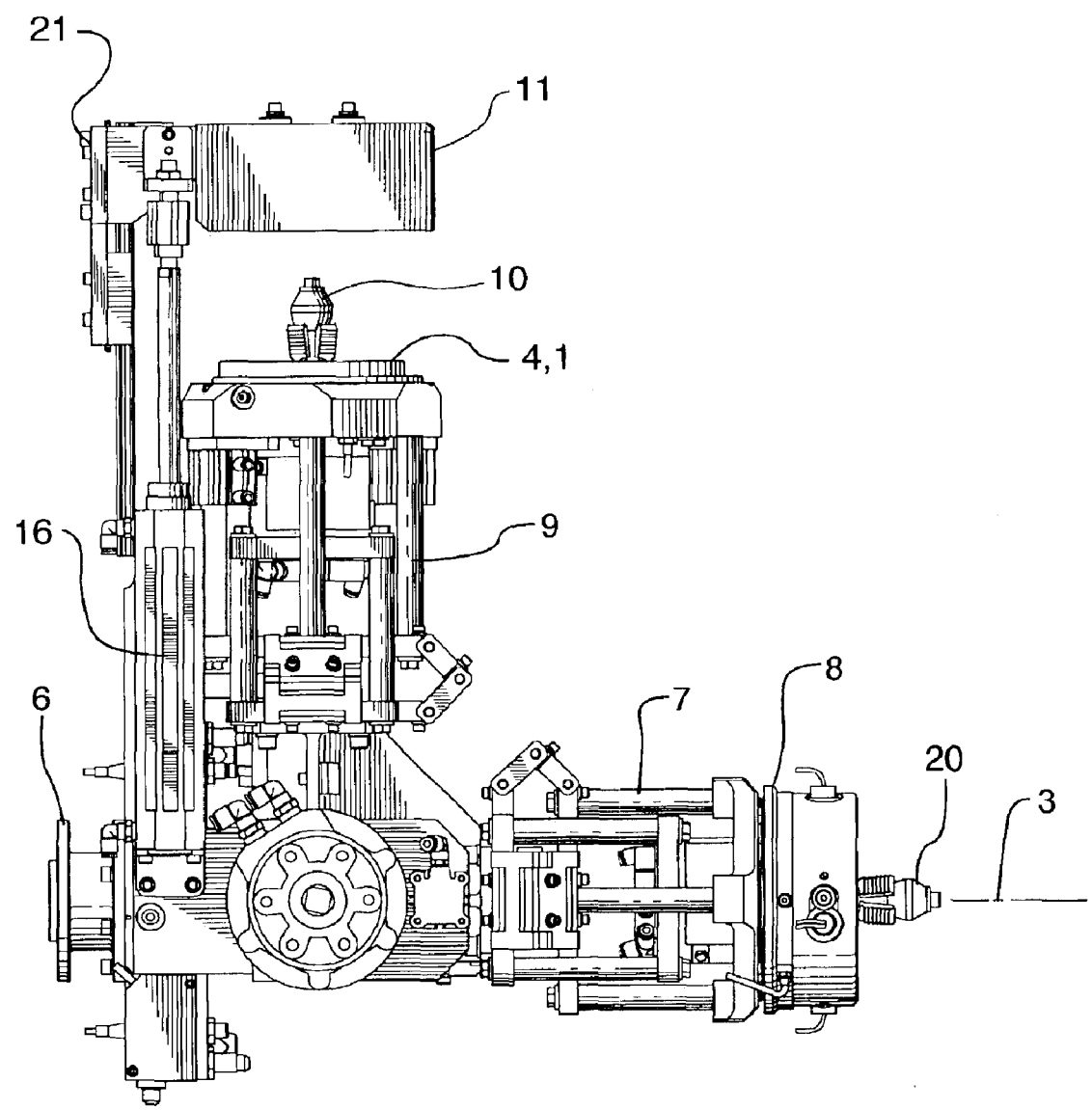
FIG. 3 is a side view of the combination tool shown with the operating axis as a horizontal line with tool arms positioned in a "home" preparation position.

The combination tool is shown in side view in FIG. 3 and includes a base 6 that matches the tool support of the robot. A conventional robot for example would include a stationary pedestal with an articulated jointed arm extending to the tool support. The robot has the capability of rotating and translating the tool support in any desired direction with its parameters of operation.

Figure 7:
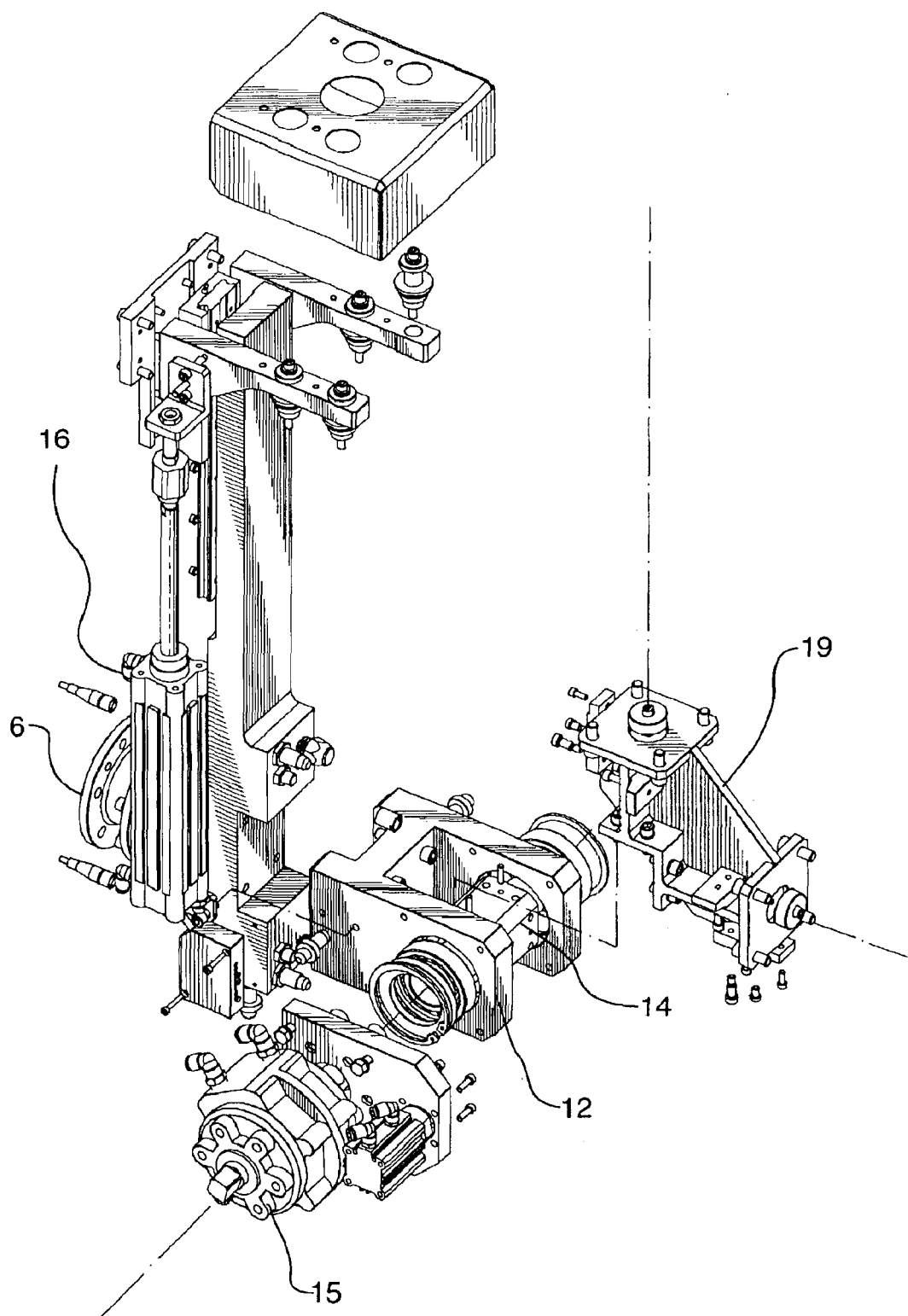
FIG. 7 shows a perspective exploded view of the tool base with arms removed to show the rotating shaft and rotary actuator for positioning the arms as well as linear actuator for engaging the mounting surface preparation heater module with the mounting surface of the part.

In the example shown in FIG. 7, the tool base 6 supports an indexing module 12 with rotary actuator 15 turning a shaft 14 upon which a support bracket 19 is fixed to support the workpiece arms 7 and the part delivery arm 9. In the embodiment shown in FIG. 7, the base also supports a pneumatic cylinder or other linear actuator 16 serving to bring the mounting surface of the part 1 into engagement with the mounting surface preparation module 11 or hot plate heater in the embodiment illustrated. This arrangement is particularly advantageous since the weight of the part delivery arm 9 need not include the extra weight of a heater 11, retractable arm 21 and linear actuator 16, thereby minimizing inertial mass, and vibration for example. However, in other applications it may be desirable to combine the heater 11 and part delivery arm 9, to reduce size or permit access for example.

Figure 4:
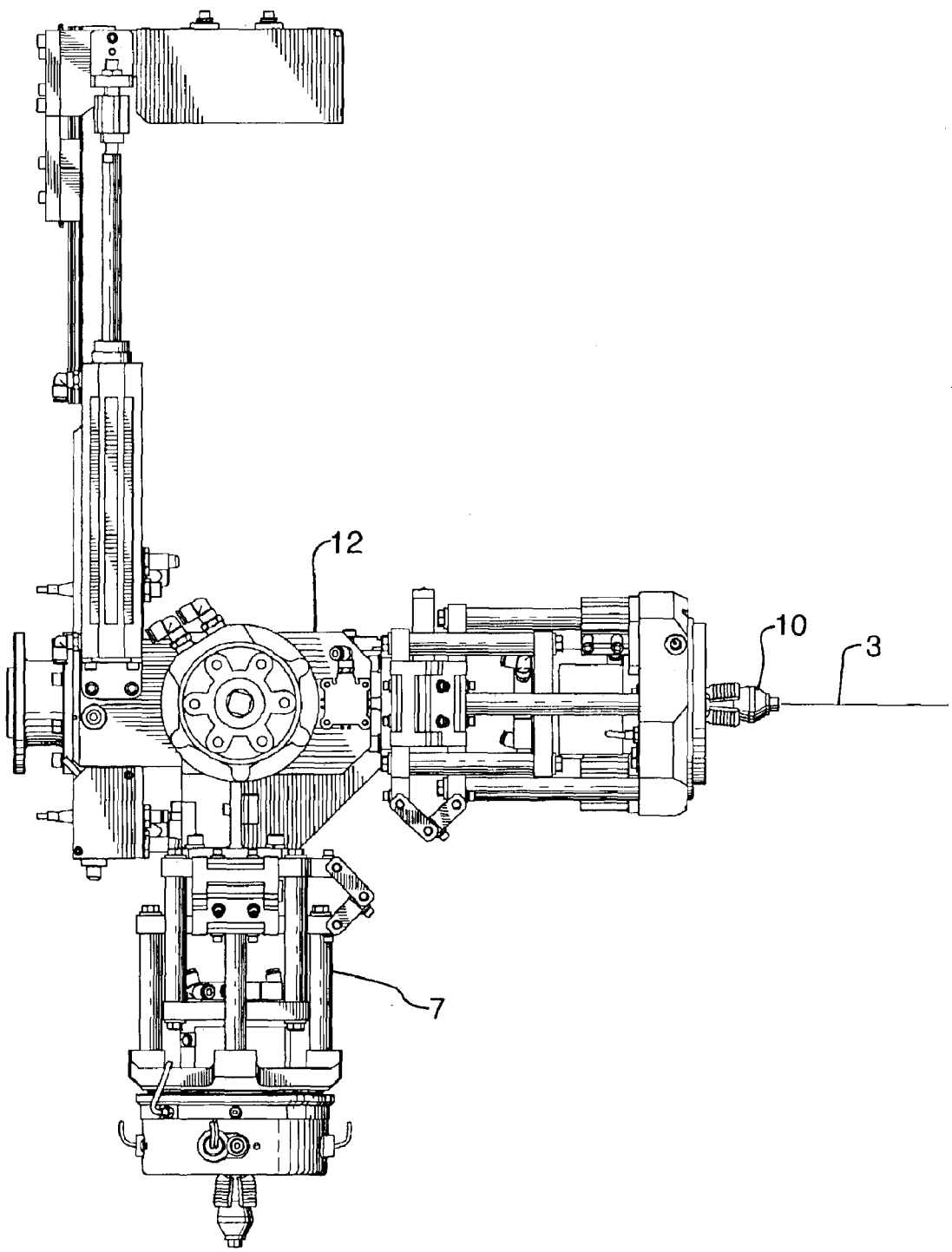
FIG. 4 shows a like side view with part delivery arm rotated 90 degrees to orient along the operating axis for picking a part from the part supply.

As shown in the views of FIGS. 1, 3 and 4, the workpiece arm 7 is rotated or positioned by the indexing module 12 and is supported on the base 6. The workpiece arm 7 preferably has a limited degree of axial motion capability in order to bring the front surface of the workpiece arm 7 into proximity with the workpiece 2. In the embodiment illustrated the workpiece arm 7 and part delivery arm 9 both include slide rod mechanisms for this purpose and the robot itself is able to accommodate a wide freedom of accurate movement in any desired direction or orientation.

The workpiece arm 7 includes a workpiece target surface scanning module 8 that includes offset means to communicate workpiece target surface position data to the robot. By scanning the surface, the scanning module 8 determines the precise position and planarity of the target surface 5 on the workpiece 2 and in conjunction with the robot's control system, adjusts the position of the tool relative to the actual position of the target surface 5 on the workpiece 2. By individually scanning and calculating offsets for each target surface 5 for each workpiece 2, the inherent variations in blow moulded plastic gas tanks can be rapidly and simply accommodated by the flexible manufacturing system using the present combination tool.

The workpiece arm 7 also includes a workpiece target surface preparation module 13, such as a heater for heating the target surface 5 of the plastic workpiece 2. To bring the heater 13 into close contact with the target surface 5, the workpiece arm 7 also includes a centering and clamping module 20 that enters an opening in the centre of the target surface 5 and retracts to spread lateral clamping surfaces within the opening. However, it will be understood that depending on the nature of the assembly operation and workpiece 2, the workpiece target surface preparation module 13 can take various forms such as a heater, an adhesive applicator, a sealant applicator, a surface abrader, grinder or a cutter for example. In addition, the workpiece target surface scanning module 8 may be selected from any number of common scanning devices such a laser scanner, an optical scanner, a sonic scanner or an infrared scanner.

With reference to FIGS. 1 and 3, the part delivery arm 9, as mentioned above, is also mounted to the support bracket 19 and shaft 14 that is rotated by the rotary actuator 15 of the indexing module 12 and supported by the base 6. The part delivery arm 9 includes a part gripper 10 that, in the embodiment illustrated, is inserted through a circular opening in the part 1. When the centre core of the gripper 20 is retracted, lateral surfaces expand to realisably hold the part 1 with the mounting surface 4 exposed. The part mounting surface preparation module 11 in the present example is a hot plate heater but also can include other surface preparation functions such as an adhesive applicator, a sealant applicator, and abrader or surface grinder or a cutter depending on the needs of the assembly method. The heater 11 is supported by the base 6 through a retractable arm 21 operated with linear actuator cylinder 16 such that the heater 11 moves to an engaged position (shown in dashed outline in FIG. 5) where the heater 11 is in contact with the part mounting surface 5 while the part 1 is held in the part gripper 10. The heater 11 also can be moved by the cylinder 16 to a disengaged position (as shown in solid outline in FIGS. 5 and 3) where the heater 11 is retracted from the part mounting surface 4.

Figure 5:
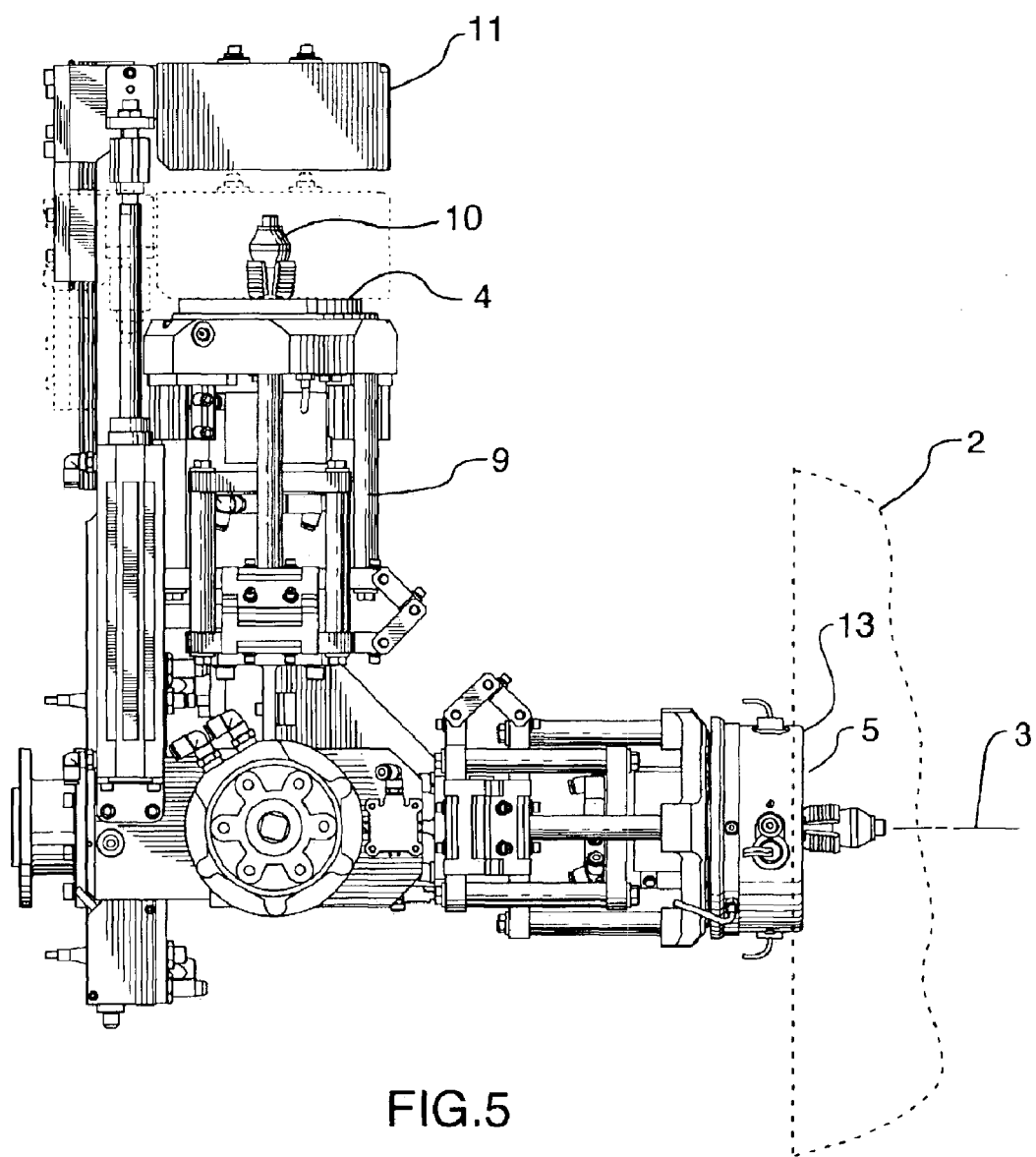
FIG. 5 shows the side view with workpiece arm on the operating axis with target surface preparation heater abutting the target surface of the tank (shown in dashed outline) with the mounting surface of the part engaging the mounting surface preparation heater (shown also in dashed outline).

Therefore as shown in FIG. 5, heating of the target surface 5 of the tank with the target surface heater 13 occurs simultaneously while the mounting surface heater 11 is engaged with and heats the plastic mounting surface 4 of part 1 retained on the part delivery arm 9.

Figure 6:
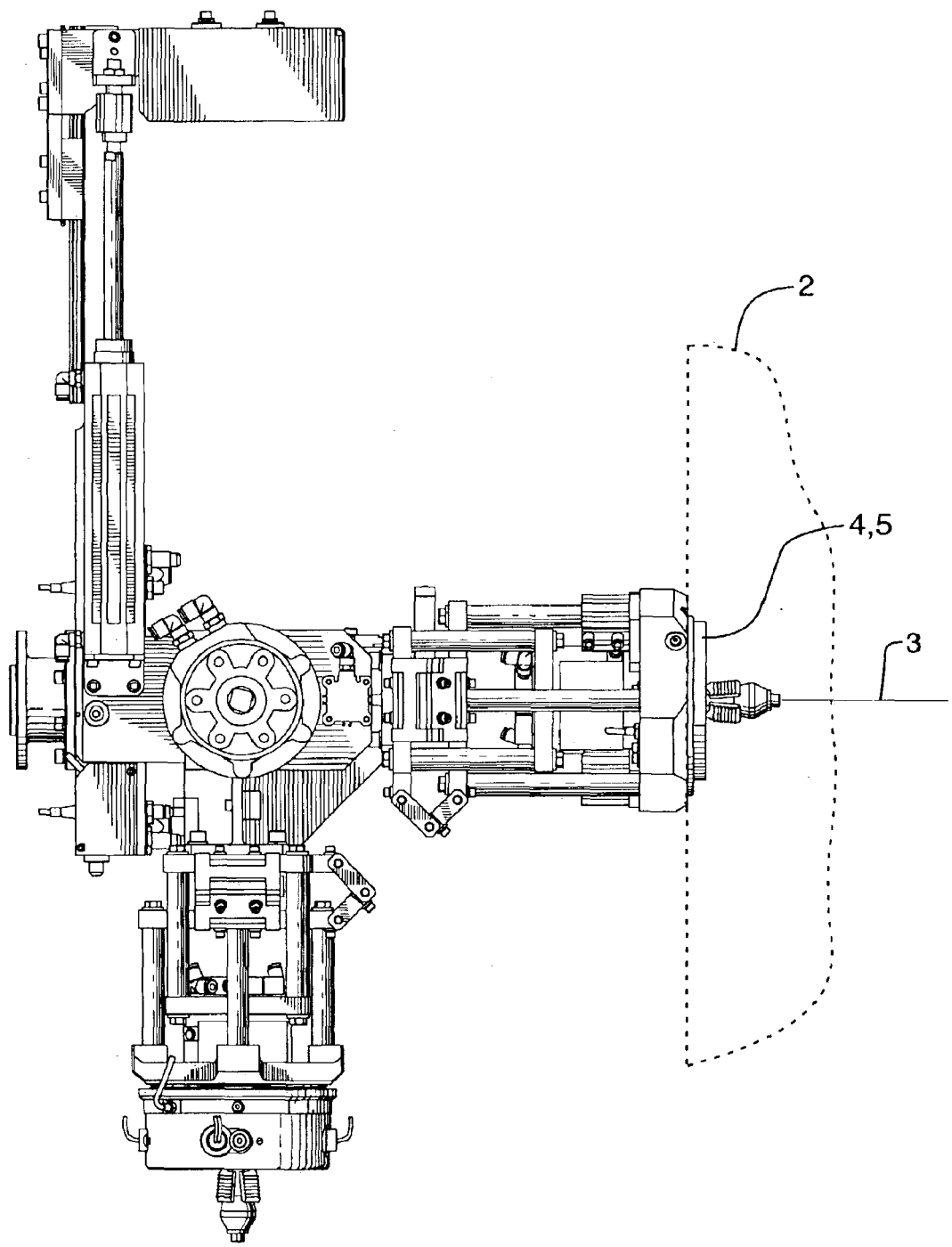
FIG. 6 shows the tool rotated again to the assembly position with the workpiece arm withdrawn and the part delivery arm aligned on the operating axis to position and press the heated mounting surface of the part against the heated target surface of the tank.

The indexing module 12 supports both the workpiece arm 7 and the part delivery arm 9 whereas rotary actuator 15 alternates between a preparation position (shown in FIGS. 1, 3 and 5) and an assembly position (shown in FIG. 4 and 6, for example). In the embodiment illustrated, the indexing module is a simple rotary device rotating only 90 degrees on a shaft axis 17 transverse to the operating axis 3. However, it will be understood by those skilled in the art that the indexing module 12 can also accommodate more than 2 tool arms, may include linear actuators or may be moved in a polar motion for example depending on the workpiece clearances and the particular needs of the assembly operation. However, a simply rotary 90 degree action is all that is required for the present example described.

As shown in FIGS. 1, 3 and 5 the indexing module while in the preparation position illustrated supports the workpiece arm 7 aligned on the operating axis 3 while simultaneously supporting the part delivery arm 9 aligned with part mounting surface preparation heater 11. In the assembly position shown in FIGS. 4 and 6, the indexing module 12 supports the workpiece arm 7 withdrawn from the work piece 2 (see FIG. 6) while simultaneously supporting the part delivery arm 9 aligned on the operating axis 3.

As best illustrated in FIG. 1, the combination tool has a shaft axis 17 and a linear actuator axis 18, that together with the operating axis 3 are mutually orthogonal. This is a relatively simple straight forward orientation adaptable for many applications. However, it will be understood that with appropriate modifications, any orientation or positioning can be accommodated by using different designs of indexing modules 12.

Therefore, the method of assembling the part 1 to the workpiece 2 with the combination tool supported on the robot follows the steps below.

FIGS. 1 and 3 show the tool in its home position at rest before the assembly commences. On commencing the sequence however the combination tool is indexed to the assembly position shown in FIG. 4.

The robot with part gripper 10 then picks a part 1 with the part delivery arm 9 from a part supply station (not shown). The part supply station can be the type conventional for robotic assemblies including a tray of individual components.

Once the part is secured in the part gripper 10, the tool is indexed to the preparation position shown in FIG. 5. The workpiece target surface scanning module 8 is activated and communicates workpiece target surface position data to the robot. As mentioned above, the tolerances for blow moulding plastic gas tanks are relatively large since there is a degree of shrinkage, and distortion inherent in this process. As a result, the robot is required to accurately scan and calculate any offsets necessary to position the tool on the target surface 5. After communicating the target surface position data if necessary the robot moves to set the tool operating axis 3 of the tool to coincide with the axis on the workpiece 2 within the acceptable degree of tolerance. The robot sets the tool operating axis and calculates tool offsets relative to the position and orientation of the scan target surface 5.

As indicated in FIG. 5, the surface preparation stage can be commenced which in the present example involves heating both the target surface 5 of the workpiece 2 and the mounting surface 4 of the part 1 simultaneously. In general terms however, the part mounting surface 4 is simultaneously engaged with the part mounting surface preparation module 11 while the workpiece target surface preparation module 13 engages simultaneously with the target surface 5. These positions are both shown in FIG. 5 in dashed outline.

Once heating has progressed to the necessary level for plastic welding, the tool is then indexed to the assembly position shown in FIG. 6. In the assembly position, the part heater 11 is retracted and the indexing module rotates both arms 90 degrees. Using the previously set tool operating axis 11 and calculating tool offsets, the prepared part mounting surface 4 is engaged with the prepared workpiece target surface 5. Sufficient pressure is exerted to bond the hot surfaces of the part and the workpiece 2. Once an acceptable bond is made, the part gripper 10 is released and the tool is withdrawn from the part/workpiece assembly.

As will be appreciated therefore the invention has the advantage of simultaneously preparing two surfaces as shown in FIG. 5 as well as rapid deployment to the position shown in FIG. 6.

The tool accommodates all necessary motions and the robot itself need not be repositioned after the target surface 5 has been scanned and any offsets accommodated by the robot moving slightly if necessary. As a result, significant reduction in cycle time and cost reduction can be achieved. It will be understood that two or more arms can be accommodated as well as any required indexing motion with different designs of indexing modules.

FIGS. 8 through 17 show details of a second embodiment of the invention where a common tool interface is utilized to enable rapid tool changes with minimal down time. The hot plate heaters and parts grabber as well as load cells are interchangeable and detachable being releasably mounted with a common tool interface which includes a releasable mechanical mount and optional electrical power connection, communications control connection, pneumatic power connection and/or hydraulic power connection. By designing the tool mounting with a common tool interface, various sizes and types of tools can be stored in a tool rack adjacent to the robot and chosen for the appropriate function by the programming. When a tool change is required to accommodate a different sized part or work piece, the programming of the robot merely requires that the tool be changed to the proper size or operation tool.

Figure 8:
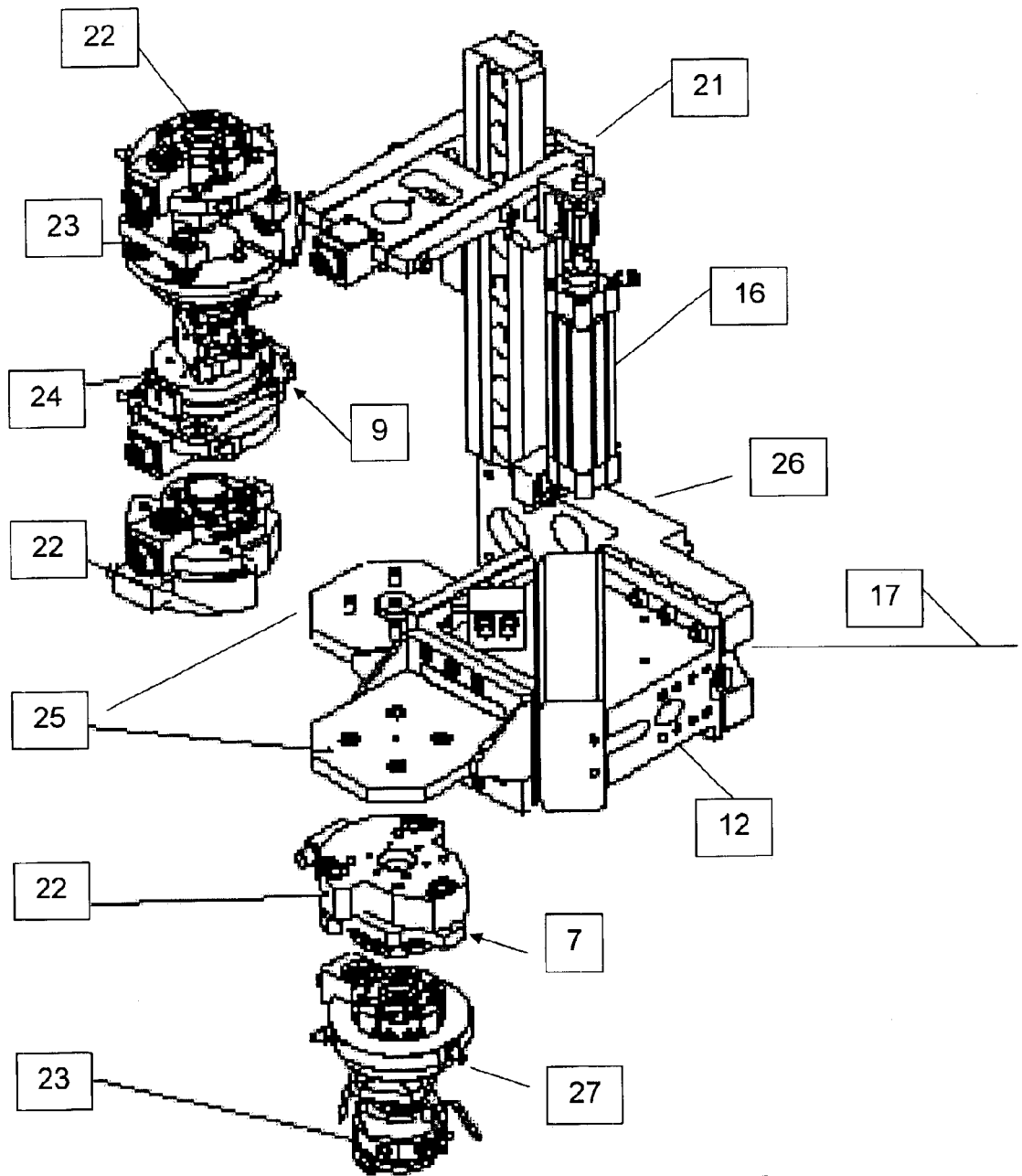
FIGS. 8–17 show a second embodiment of the invention with interchangeable and detachable tools such as hot plate heaters and part grippers, all having a common tool interface to enable rapid tool changes with minimal downtime.

FIG. 8 shows an exploded perspective view of the second embodiment combination tool. The indexing module 12 rotates 180° about the shaft axis 17 and supports the two mounting plates 25 which in turn support a load cell assembly 22, interchangeable hot plate 23 and interchangeable gripper 24 which form the part delivery arm and the work piece arm respectively. In a manner described in association with the first embodiment, the linear actuator 16 (such as a pneumatic cylinder) operates the retractable arm 21 to engage and disengage the mounting surface preparation module or hot plate 23 together with the mounting surface of the part held in the part gripper 24.

Figure 9:
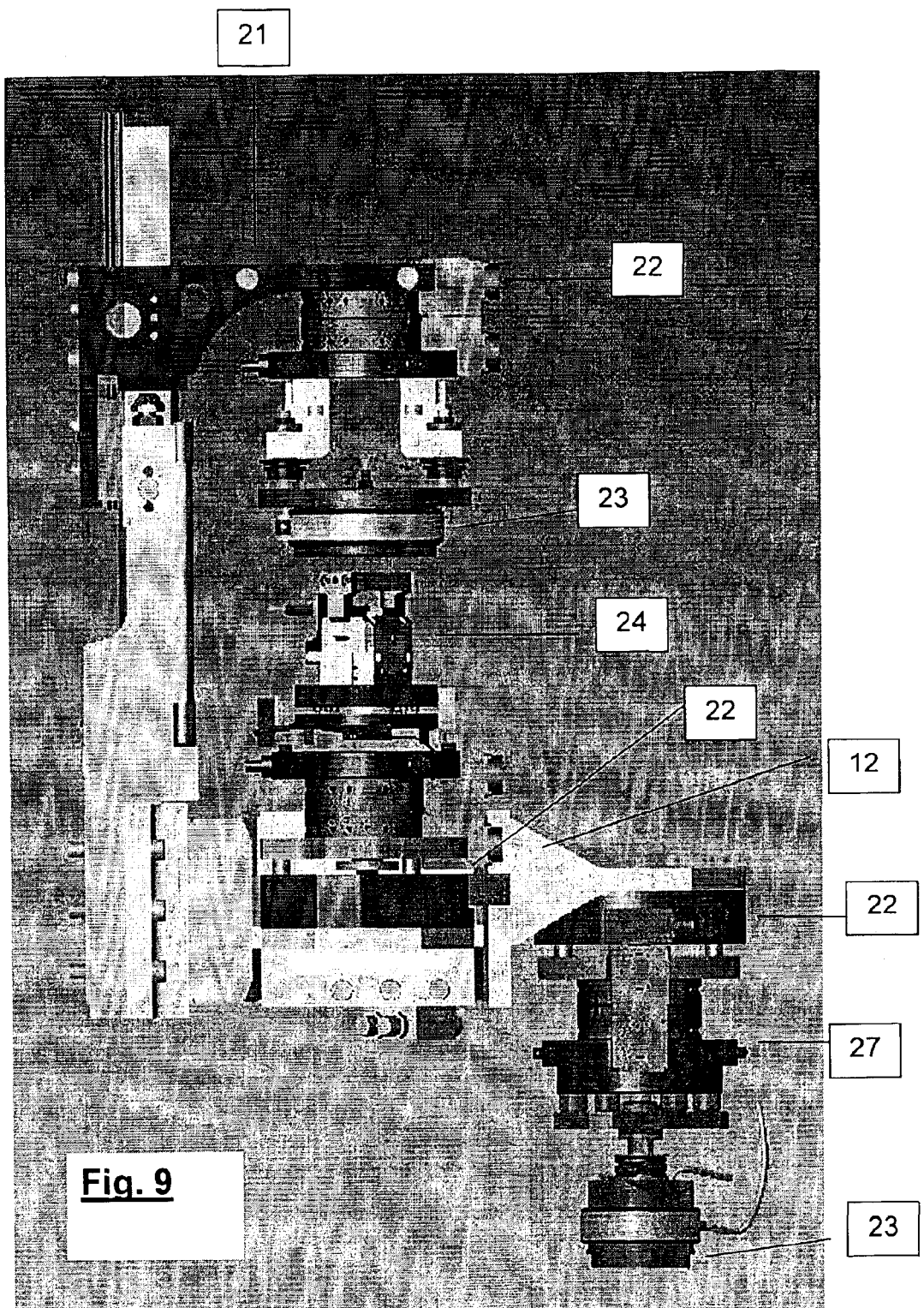

FIG. 9 shows a side view of the second embodiment in the home position with the part delivery arm with interchangeable part gripper 24 facing upwardly toward the mounting surface preparation heater 23. A load cell 22 is disposed between the hot plate 23 and the retractable arm 21 to detect and regulate the pressure applied.

The target surface preparation heater 23 or interchangeable hot plate 23 faces downwardly in the home position as shown. A second load cell assembly 22 is disposed between the interchangeable hot plate and the indexing module 12 also to measure the pressure or load applied. Each of the interchangeable hot plate 23 and interchangeable part gripper 24 are mounted with a common tool interface described below and in order to accurately position the removable tools in the tool rack adjacent to the robot, three locating pins 27 extend from each of the interchangeable components 23 and 24.

Figure 10:
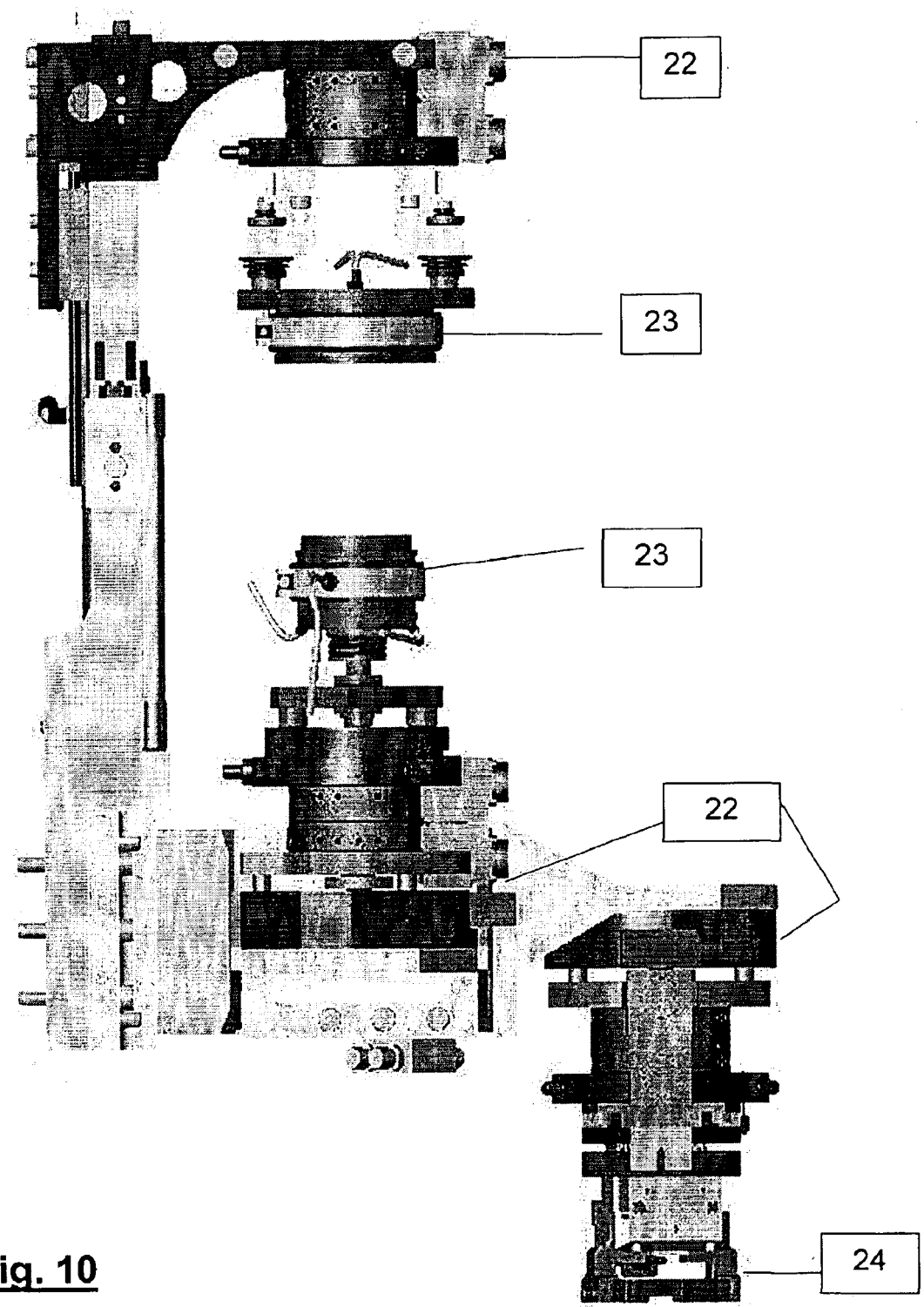

FIG. 10 shows a side view after further rotation of 180° to enable the interchangeable part gripper 24 to pick part from a parts tray.

Figure 11:
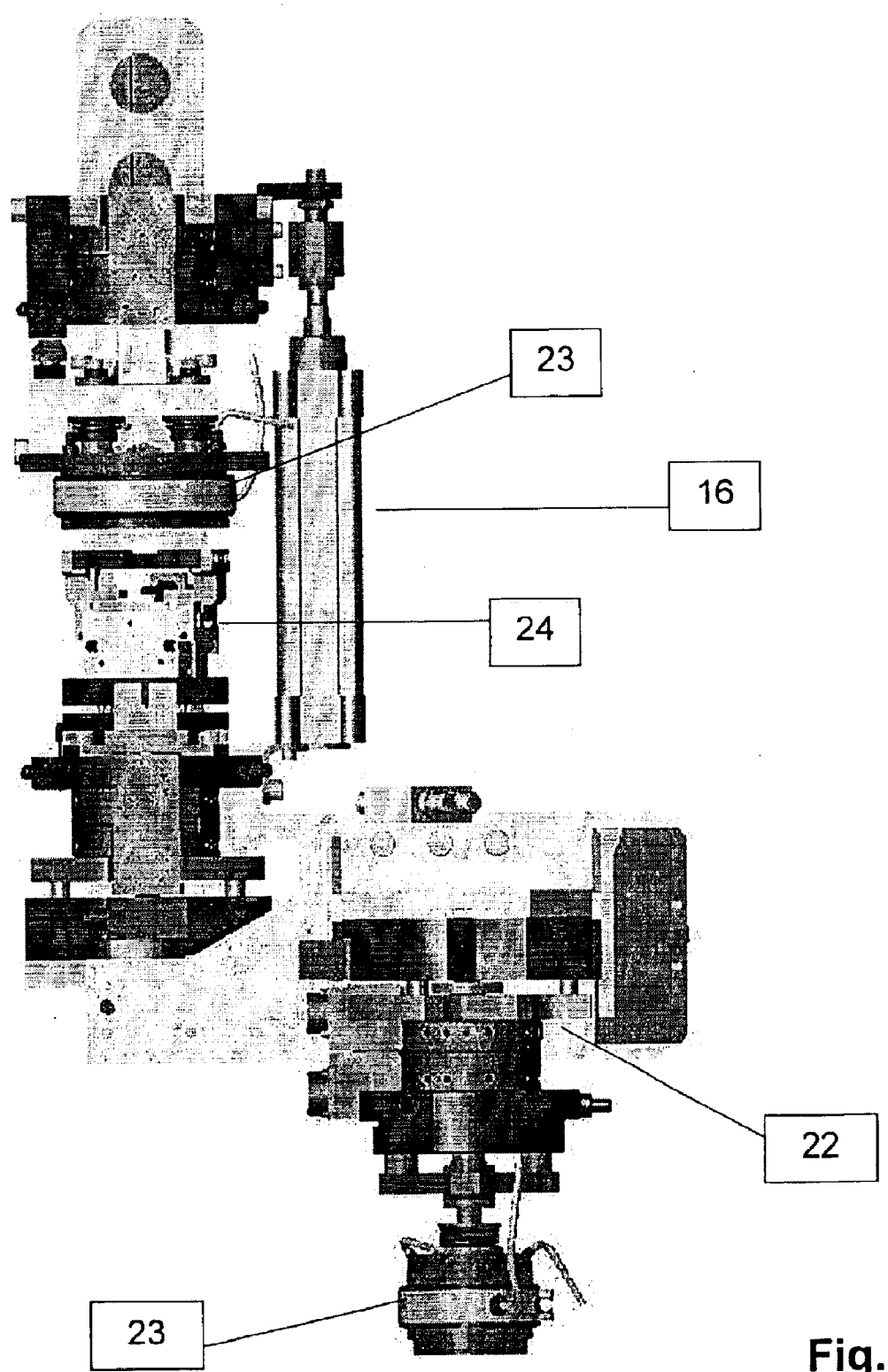

FIG. 11 shows another side view after a further 180° rotation to engage the part held in the part gripper 24 with the hot plate or mounting surface preparation heater 23 which is driven downwardly by actuation of the linear actuator 16 to heat the mounting surface of the part. In this position simultaneously the interchangeable hot plate 23 on the work piece arm is directly downwardly to heat the target surface of the work piece or plastic gas tank.

Figure 12:
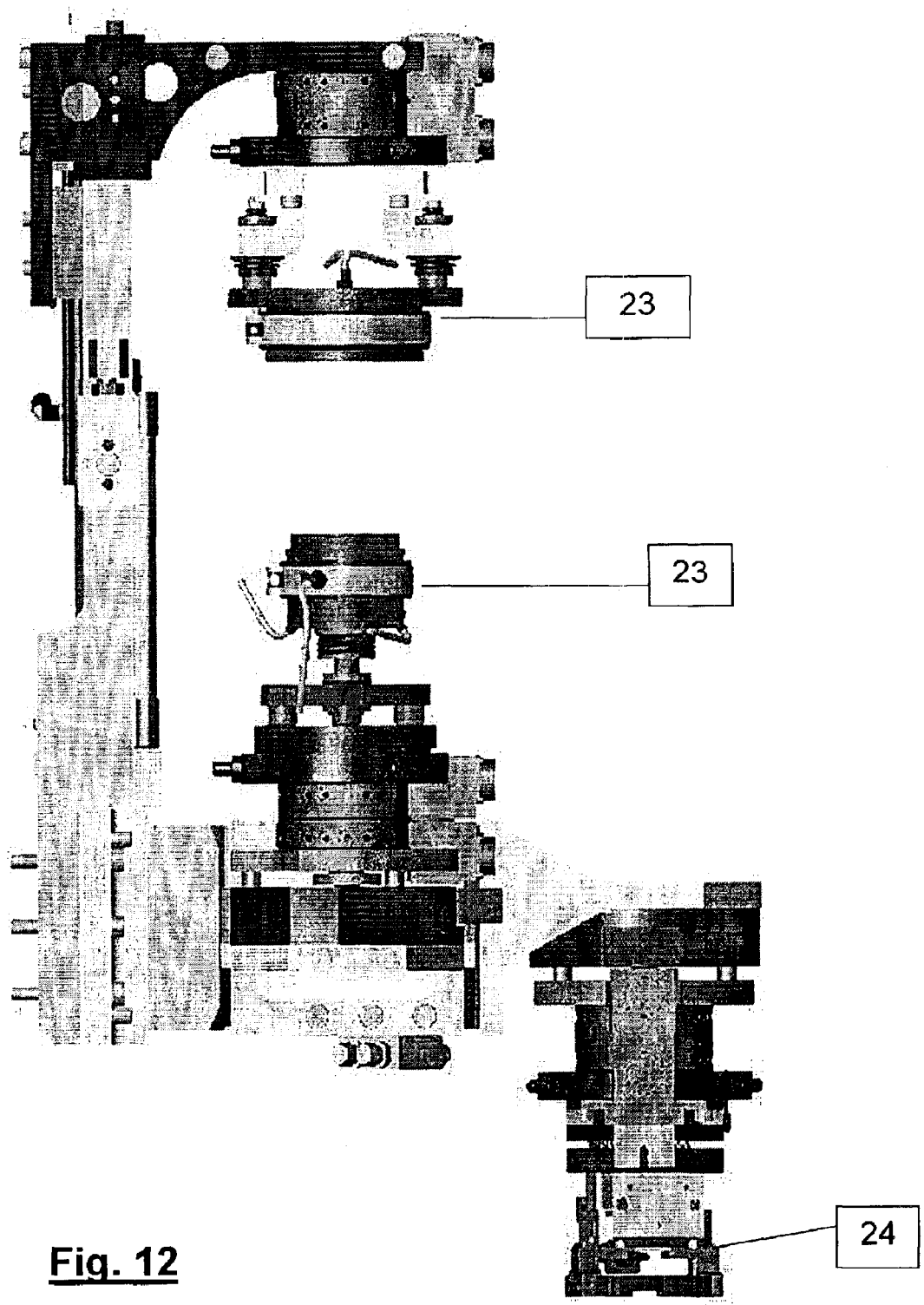

FIG. 12 shows the positions of the components once sufficient heat has been applied to the mating surfaces and the arms are rotated again 180° such that the work piece arm is disengaged from the hot target surface of the plastic gas tank and the part delivery arm is directed downwardly to engage the heated surface of the part holding the part gripper 24 against the heated target surface of the work piece. Thereafter, the combination tool returns to its home position as shown in FIGS. 8 and 9.

Figure 13:
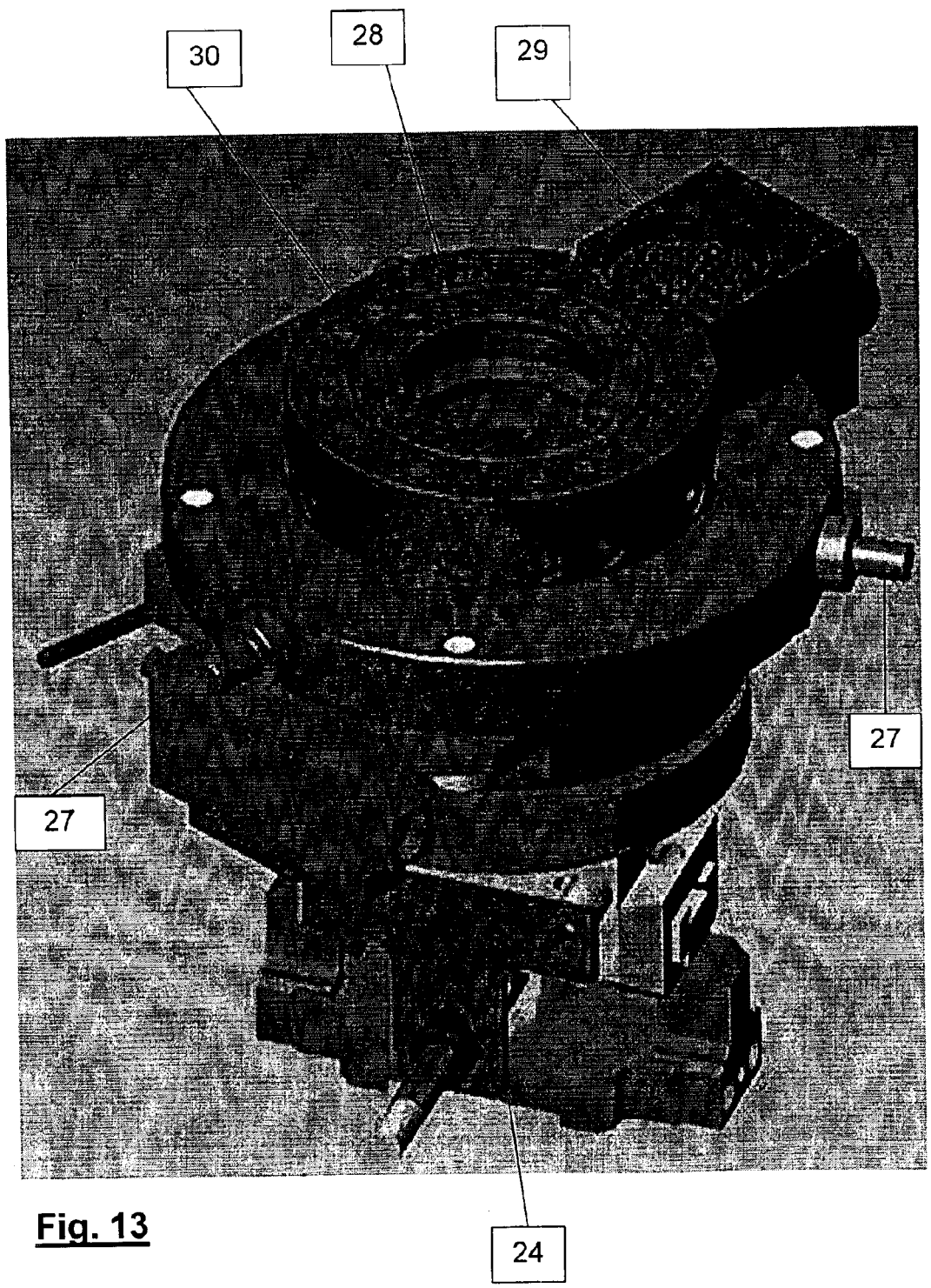
Figure 14:
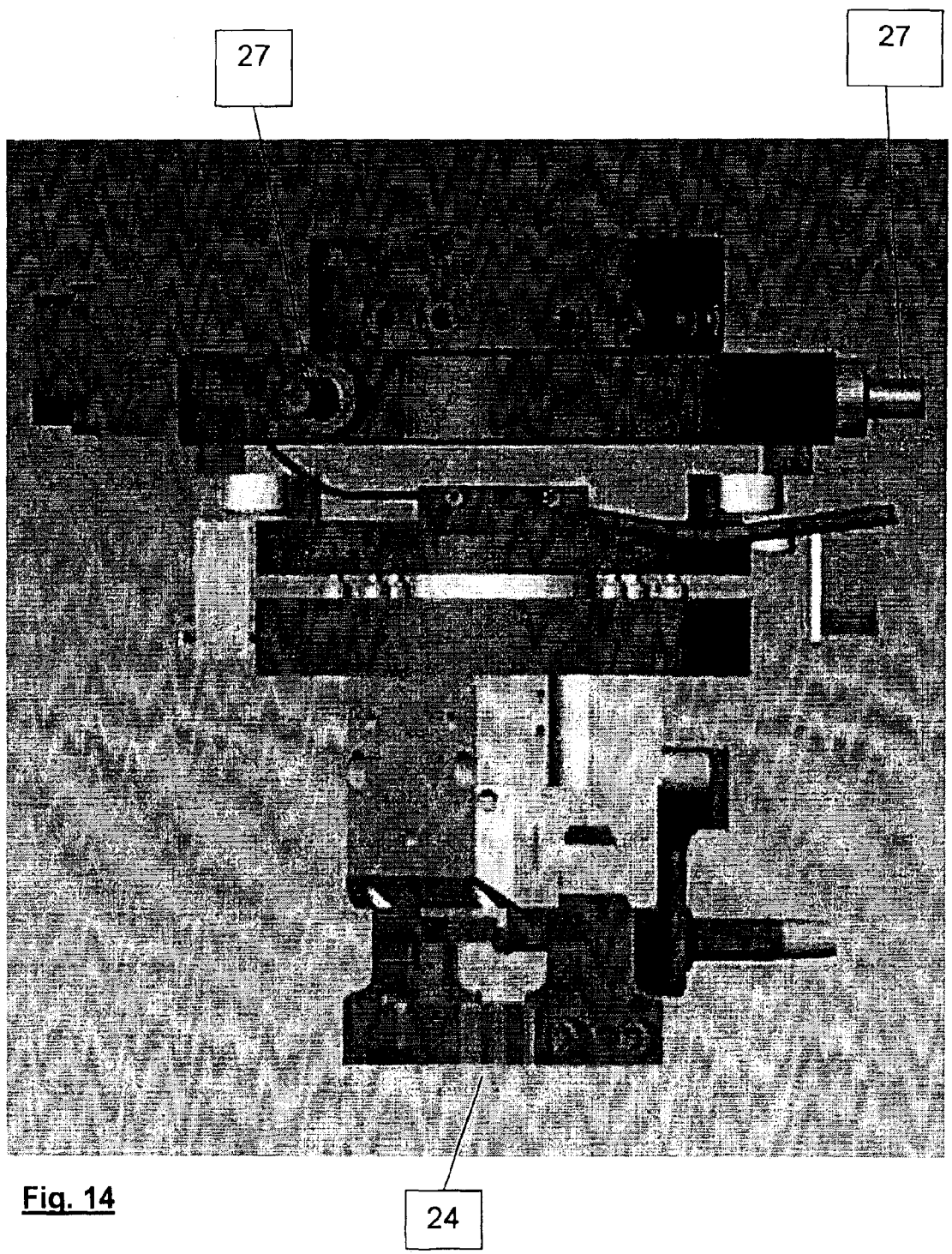
Figure 15:
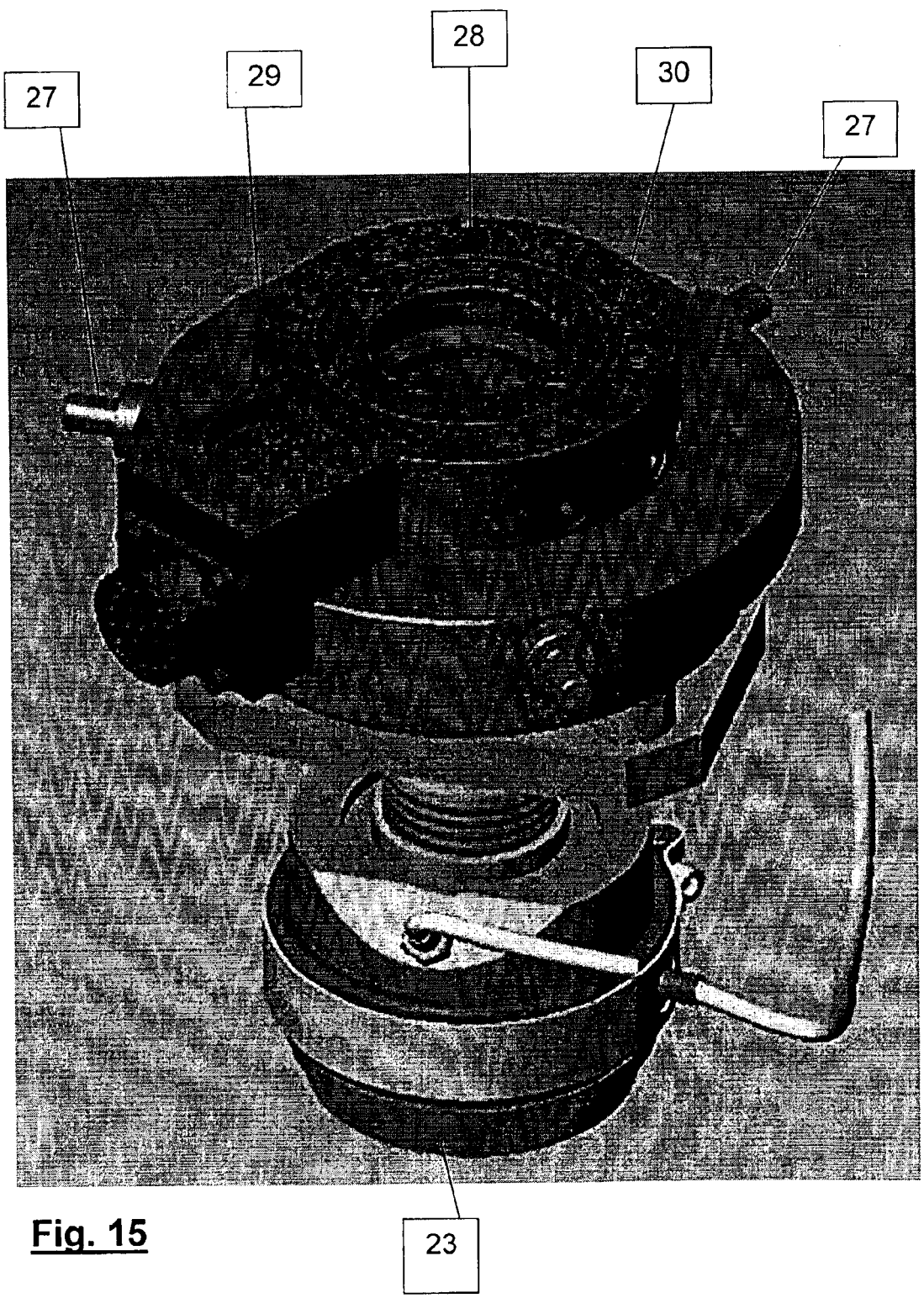
Figure 16:
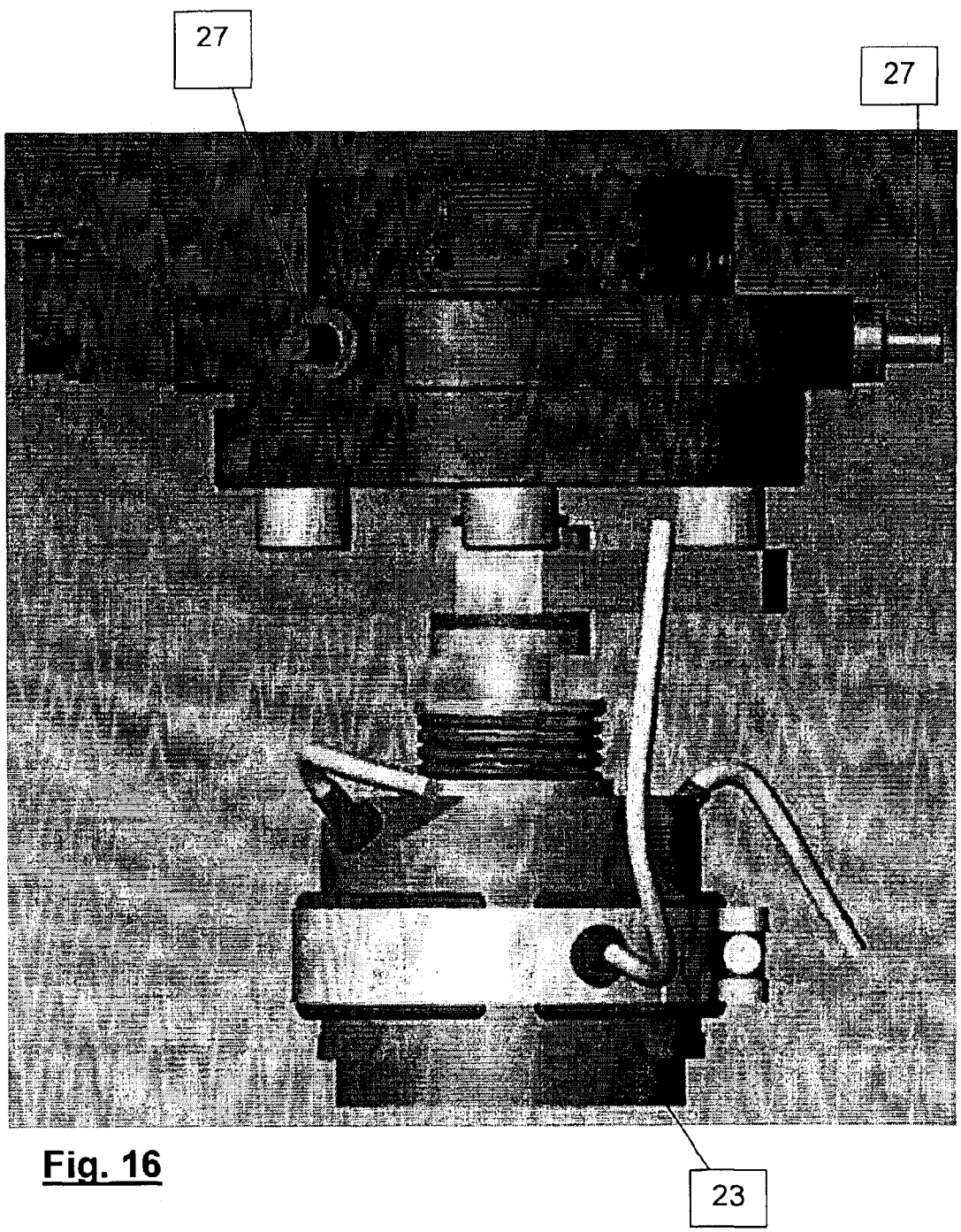
Figure 17:
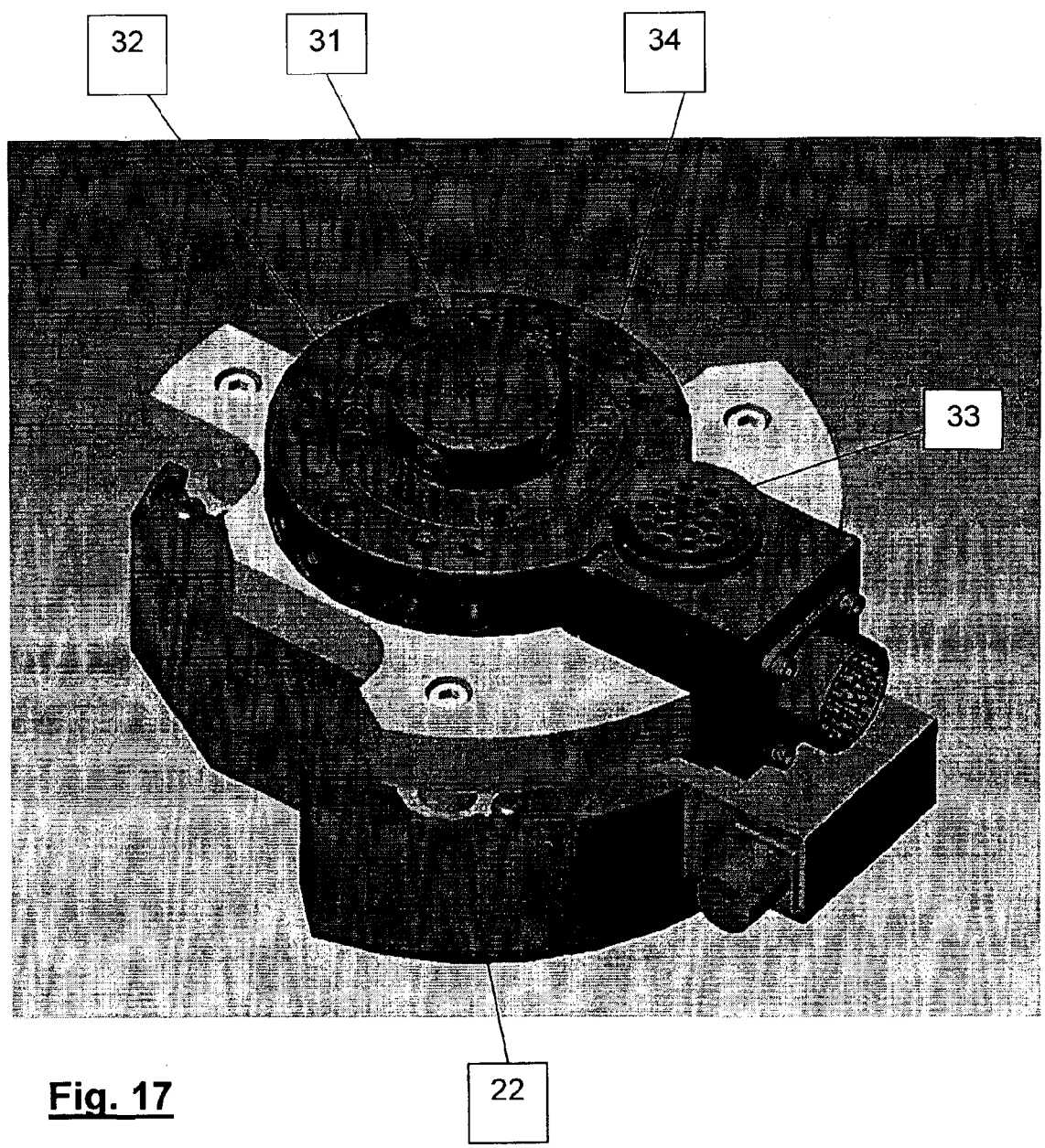

FIGS. 13, 15 and 17 in particular show the details of the common tool interface which provides for interchangeability of all tools including the interchangeable parts gripper 24 shown in FIGS. 13 and 14, the interchangeable hot plate 23 shown in FIGS. 15 and 16 and the interchangeable load cell assembly 22 shown in FIG. 17.

Turning to FIGS. 13 and 14, the interchangeable parts gripper 24 is shown in the upper surface of which includes the common tool interface. A central opening 28 provides a mechanical mount and three locating pins 27 provide for accurate placement in a tool rack adjacent to the robot. A standardized electrical connector 29 provides for electrical power connection and communications control connection, which is preferably common to all tools 23, 24 and load cells 22. Pneumatic power connection and hydraulic power connection is accomplished by a number of ports 30 adjacent to the central opening 28. The ports 30 transfer fluid power via air or hydraulic fluid between the two mating or opposing components of the common tool interface. The ports 30 are automatically closed to retain pressure when disconnected from the opposing components of the common tool interface.

Referring to FIGS. 15 and 16, it can be seen that the interchangeable hot plate 23 includes an identical central opening 28, electrical connection 29 and series of hydraulic/pneumatic ports 30. In this manner the interchange of tools of various sizes and capacities has been standardized. Use of a common tool interface ensures rapid tool change and simplifies the change over to handle various parts and to apply precise heat as required.

FIG. 17 shows the mating or opposing surface of the load cell assembly 22 providing a central boss 31 with tapered positioning pins 32 and lateral ball locking mechanism as well as female electrical connector 33 and pneumatic/hydraulic ports 34. It will be understood that in the embodiment shown, the male component of the common tool interface is shown on the load cell 22 whereas the female component of the common tool interface is shown in FIGS. 15 and 13. It will be understood however that this arrangement is merely illustrative of the general concept and variations in the location and configuration of such interfaces will be contemplated.

Although the above description relates to a specific preferred embodiment as presently contemplated by the inventors, it will be understood that the invention in its broad aspect includes mechanical and functional equivalents of the elements described herein.

I claim:

1. A combination tool for assembling a part to a workpiece with a robot following a programmed series of predetermined motions including picking the part from a supply and transferring the part to an assembly position aligned on an operating axis wherein a mounting surface of the part engages a target surface of the workpiece, the robot including a tool support, the combination tool comprising:

a base matching the tool support of the robot;

a workpiece arm including a workpiece target surface preparation module;

a part delivery arm including a part gripper capable of releasably holding the part with mounting surface exposed;

a part mounting surface preparation module supported by the base between: an engaged position in contact with the part mounting surface while the part is held in the part gripper; and a disengaged position retracted from the part mounting surface; and an indexing module supported on the base, the indexing module alternating between: a preparation position; and said assembly position, wherein:

the indexing module in the preparation position supports the workpiece arm aligned on the operating axis while simultaneously supporting the part delivery arm aligned with the part mounting surface preparation module:

the indexing module in the assembly position supports the workpiece arm withdrawn from the workpiece while simultaneously supporting the part delivery arm aligned on the operating axis; and wherein at least one of: the workpiece target surface preparation module; the part gripper; and the part mounting surface preparation module, are releasably mounted with a common tool interface.

2. A combination tool according to claim 1 wherein said common tool interface includes a releasable mechanical mount including at least one of: an mechanical mount opening; a mechanical mount boss; locating pin; and positioning pin.

3. A combination tool according to claim 1 wherein the common tool interface includes a releasable electrical connector including at least one of: an electrical power connector; and a communications control connector.

4. A combination tool according to claim 1 wherein the common tool interface includes a releasable fluid power ports including at least one of: a pneumatic power port; and a hydraulic power port.

5. A combination tool according to claim 1 wherein at least one of: the workpiece arm; the part delivery arm; and the part mounting surface preparation module; includes a load cell in communication with the robot.

6. A combination tool according to claim 1 wherein the part mounting surface preparation module is selected from the group consisting of: a heater; an adhesive applicator; a sealant applicator; an abrader; a cutter; and a surface grinder.

7. A combination tool according to claim 1 wherein the workpiece target surface preparation module is selected from the group consisting of: a heater; an adhesive applicator; a sealant applicator; an abrader; a cutter; and a surface grinder.

8. A combination tool according to claim 1 including a workpiece target surface scanning module, with offset means for communicating workpiece target surface position data to the robot, selected from the group consisting of: a laser scanner; an optical scanner; a sonar scanner; and an infrared scanner.

9. A combination tool according to claim 1 wherein the indexing module includes a shaft journaled to the base, the shaft supporting the workpiece arm and the part delivery arm; and includes a rotary actuator operably engaging the shaft.

10. A combination tool according to claim 9 wherein the part mounting surface preparation module comprises a linear actuator.

11. A method of assembling a part to a workpiece with a combination tool supported on a robot, wherein a mounting surface of the part is assembled on a target surface of the workpiece, wherein the combination tool comprises:

a base matching a tool support of the robot;

a workpiece arm including a workpiece target surface preparation module;

a part delivery arm including a part gripper capable of releasably holding the part with mounting surface exposed;

a part mounting surface preparation module supported by the base between: an engaged position in contact with the part mounting surface while the part is held in the part gripper; and a disengaged position retracted from the part mounting surface; and an indexing module supported on the base, the indexing module alternating between: a preparation position; and an assembly position, wherein:

the indexing module in the preparation position supports the workpiece arm aligned on an operating axis while simultaneously supporting the part delivery arm aligned with the part mounting surface preparation module:

the indexing module in the assembly position supports the workpiece arm withdrawn from the workpiece while simultaneously supporting the part delivery arm aligned on the operating axis; and wherein at least one of: the workpiece target surface preparation module; the part gripper; and the part mounting surface preparation module, are releasably mounted with a common tool interface, and wherein the method comprises:

indexing to the assembly position;

picking a part with the part gripper on the part delivery arm from a part supply station;

indexing arms to the preparation position;

simultaneously: engaging the part mounting surface with the part mounting surface preparation module; and engaging the workpiece target surface preparation module with the target surface;

indexing to the assembly position;

engaging the prepared part mounting surface with the prepared workpiece target surface; and releasing the part gripper and withdrawing the tool from a part/workpiece assembly.

12. A method according to claim 11 including the step of:

releasing at said common tool interface and storing a first tool, selected from the group consisting of: a load cell; a part gripper; and a workpiece target surface preparation module, in a tool storage area; and engaging at said common tool interface and removing a second tool, selected from the group consisting of: a load cell; a part gripper; and a workpiece target surface preparation module, from said tool storage area.

13. A method according to claim 11 wherein at least one of: the workpiece arm; the part delivery arm; and the part mounting surface preparation module; includes a load cell in communication with the robot, the method including:

communicating load data from the load cell to regulate pressure applied to at least one of: the part; and the workpiece.

14. A method according to claim 11 wherein said common tool interface includes a releasable mechanical mount including at least one of: an mechanical mount opening; a mechanical mount boss; locating pin; and positioning pin.

15. A method according to claim 11 wherein the common tool interface includes a releasable electrical connector including at least one of: an electrical power connector; and a communications control connector.

16. A method according to claim 11 wherein the common tool interface includes a releasable fluid power ports including at least one of: a pneumatic power port; and a hydraulic power port.

17. A method according to claim 11 wherein the part mounting surface preparation module and the workpiece target surface preparation module are each selected from the group consisting of: a heater; an adhesive applicator; a sealant applicator; an abrader; a cutter; and a surface grinder.

18. A method according to claim 11 wherein the part and workpiece are thermal plastic and wherein the part mounting surface preparation module and workpiece target surface preparation module are hot plate heaters.

19. A method according to claim 18 wherein the workpiece is a plastic gas tank.

* * * * *